United States Patent [19]

Kiss

[11] Patent Number: 4,913,872

[45] Date of Patent: Apr. 3, 1990

[54] GRID STEAM TREATMENT

[75] Inventor: Günter H. Kiss, Sontra, Fed. Rep. of Germany

[73] Assignee: Societe Generale, Paris, France

[21] Appl. No.: 305,462

[22] Filed: Feb. 1, 1989

[30] Foreign Application Priority Data

Feb. 10, 1988 [DE] Fed. Rep. of Germany ....... 3804416

[51] Int. Cl.⁴ ............................................. B29C 59/00

[52] U.S. Cl. ..................................... 264/320; 264/83; 264/119

[58] Field of Search ................. 264/83, 109, 119, 319, 264/320

[56] References Cited

U.S. PATENT DOCUMENTS

| | | | |
|---|---|---|---|
| 4,393,019 | 7/1983 | Geimer | 264/83 |
| 4,517,147 | 5/1985 | Taylor et al. | 264/83 |
| 4,605,467 | 8/1986 | Bottger | 156/497 |

*Primary Examiner*—Jan H. Silblaugh
*Assistant Examiner*—Mary Lynn Fertig
*Attorney, Agent, or Firm*—Marshall & Melhorn

[57] ABSTRACT

A process for the production of three-dimensionally deformed mouldings from planar blanks of binder-containing fibrous mats, which preferably contain cellulose and/or lignocellulose fibres is proposed. The initially pourable, loose fibrous material is brought into mat form and compressed to a tangled fibre fabric, from which the desired blanks are punched or separated in some other way. These blanks are subsequently softened by steam treatment or adequately plasticized for deformation purposes by some other heat treatment. In this form, they finally undergo the process which compresses or deforms the fibrous material. During or after steam treatment or the other thermal treatment, a linear or lattice-like retaining grid or pressing grid is applied to at least one side of the mat blank in such a way that, in accordance with the grid structure and at least partly stopping the thickness increase resulting from steam treatment, a corresponding compression pattern is impressed in the vaporized-on mat blank.

7 Claims, 2 Drawing Sheets

GRID STEAM TREATMENT

Figure 1:
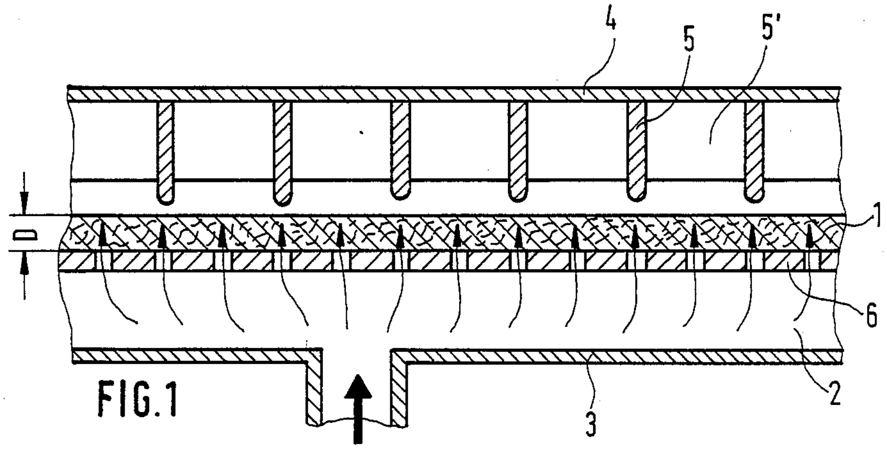

In the production of three-dimensionally shaped mouldings from mat blanks of preferably cellulose and-/or lignocellulose fibres with a suitable binder addition, such as mouldings used for the internal lining of motor vehicles, the necessary process sequence must take place in several steps. The fibrous mats ,are unable to absorb adequate tensile and shearing forces, such as occur in single-stage deformation and the wood fibres are too brittle in the dry state to permit compression to shaped articles in a suitable hot press mould without prior steam treatment. Fibrous mats of the material of interest here are therefore cut in their dry, storable state into the blanks corresponding to the shape intended for the particular shaped articles or mouldings or are punched out of the said fibrous mats. Prior to the pre-pressing process or the final pressing, said blanks must initially undergo superheated steam treatment. This leads to a softening of the fibres and a so-called plasticization occurs to the mat blank, which involves a considerable volume increase, particularly of the mat blank thickness by approximately three to five times the starting thickness. Only in this state is it possible to three-dimensionally shape the mt which is inherently non-deformable as a result of force absorption and whilst taking account of other process features which are not of interest here.

However, the plasticized and therefore greatly volume-enlarged mat or the corresponding mat blank suffers from the important disadvantage that its limited inherent rigidity which is not advantageous even with respect to the starting product from the handling standpoint is further reduced, which leads to a deterioration of the shearing and tensile force distribution during the subsequent deformation.

The problem of the present invention is to so improve a process of the aforementioned type that, whilst retaining the advantages linked with the steam treatment or plasticizing of the mat blank in connection with the following moulding process, the inherent rigidity of the mat blank is increased at least in partial areas in such a way that there is an improved shearing and tensile stress distribution during deformation.

Due to the act that during or after plasticizing the mat blank, the mat in a linear, punctiform, grid-like or some other structure is at least partly prevented from undergoing a thickness increase, the original strength of the fibrous material along and in said given structures are approximately maintained, whereas otherwise over the entire mat blank the desired action of the steam treatment can take place in an unimpeded manner.

If e.g. the thickness D of the original untreated mat blank is tripled during the plasticizing process, i.e. increased to 3 D, then the retaining grid structure can ensure that along the structure lines or the like the mats only expand to 1.5 D. Thus, along the structure lines the original mat blank strength is maintained, whereas the actual mat material, e.g. in the case of a screen-like grid is extended between the grid structures in cushion-like manner to the intended thickness and can therefore assume the advantages of plasticizing. It is advantageous and important for this to match to the lattice-like dimensions of the grid structure the difference of the swelling of the mat material between the areas, lines or points given by the grid-like compression pattern and the resulting steam-treatment maxima. For example, the mesh spacing or a cross grating system could be 5 to 10 D, if D is the thickness of the steam treatment mat.

It can also be advantageous to apply the grid-like compression pattern during the steam treatment of the mat blank in a non-uniform manner over the latter over its entire surface or its two surfaces and instead, as a function of the intended use of the moulding produced therefrom, to only give the compression pattern to the mat blank in certain areas.

According to a further advantageous development of the procedure, the mesh width or size of the compression pattern to be impressed can differ for different areas of the mat blank. It can also be advantageous to zonally vary the "immersion depth" of the compression grid over the mat blank, i.e. to set it to e.g. 1.5 D along the edge area and to 2.5 D in the central area.

The thickness enlargement of the mat blanks can be varied prevented in line, point or grid-like manner e.g. by screen-like wire structures, an adequate inherent stiffness and metal grids, which can be advantageously used in this connection.

If the compression pattern is impressed following steam treatment, it can be advantageous to use cooled lattice-like or linear compression grids. In this case, in the vicinity of the compression pattern an additional strengthening of thermoplasticly acting binders occurs in the mat, which additionally improves the inherent strength of the mat blank. A further advantage of subsequently pressed in compression patterns is that the fibrous mat blank can be more highly compressed in the compression patterns than in the initial state.

The invention is described in greater detail hereinafter relative to non-limitative embodiments and the attached drawings, wherein show:

FIG. 1 a greatly simplified detail of an apparatus indicating the start of the steam treatment of the mat blank.

Figure 2:
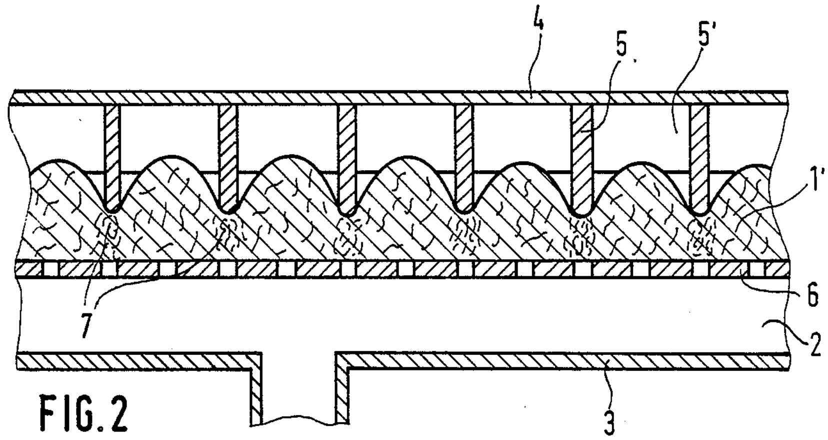

FIG. 2 the same detail at the end of the steam treatment.

Figure 3:
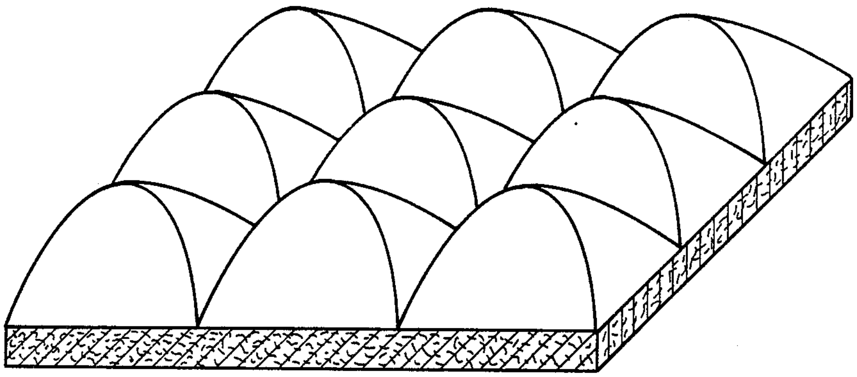

FIG. 3 the state of the steam treated mat blank according to the invention by means of a simplified, respective representation of a detail of the material.

According to FIG. 1, the non-steam treated mat blank 1 in its crude state initially has the thickness D. The lower part of the steaming apparatus is formed by the diagrammatically represented lower case 3 and the perforated bottom 6. Both components surround the steam space 2, into which steam introduced in the direction of the bold faced arrow. The upper case of the steaming apparatus, which can be opened for inserting the mat blank 1, is e.g. formed by a sheet metal case 4, to which is fixed a grid-like grating web 5,5'. The sectionally represented webs 5 have a greater height than the cross-webs 5', so that webs 5 form areas of higher compression, whereas cross-webs 5' provide lower compression lines. In this way anisotropic deformations characteristics are given to the fibrous mat blank, so that it is possible to adapt to highly asymmetrical shapes. The steam passes out of the steam space 2 in the direction of the small arrows into the mat blank and plasticizes the latter, accompanied by a considerable thickness increase.

FIG. 2 shows in the same detail representation and with the same designation of the components, the final state of plasticization as a result of steam action. From the constant thickness mat blank 1 has formed the blank shape 1', which beneath the grating webs 5 now has zones 7, in which the steam treated mat blank is more highly compressed and therefore has a higher strength. In, FIGS. 1 and 2, the compression pattern is applied during steam treatment.

FIG. 3 illustrates in perspective form the "cushion structure" of the mat blank after steam treatment, also in the form of a detail representation.

FIG. 3 shows in particular that the more highly compressed zones of the mat blank after steam treatment lead to a net-like inherent reinforcement of the steam treated mat blank. In particular, the increased tensile strengths of the inherent reinforcement net favour the troublefree tightening of the fibrous material during deformation. As the inherent reinforcement net has the possiblility of mesh deformation, the adaptability and therefore the resilience of the steam treated mat blank are not impaired.

I claim:

1. A process for shaping a resin-impregnated fibrous mat, containing cellulose or lignocellulose fibers or a mixture thereof, comprising the steps of:

(A) providing a resin-impregnated fibrous mat;

(B) providing a lattice-like grid in superposition to at least a portion of a surface of the fibrous mat; and (C) contacting the fibrous mat with steam, at a temperature and for a time sufficient to cause the fibrous mat to expand in such a manner so as to urge the portion of the surface of the fibrous mat into engagement with the grid, thereby preventing further expansion of the fibrous mat at locations in contact with the grid while allowing further expansion of the mat at locations not in contact with the grid.

2. The process, according to claim 1, wherein the grid is in superposition to the entire surface of the fibrous mat.

3. The process, according to claim 1, wherein the steam is superheated.

4. The process, according to claim 1, wherein the grid is cooled during step C.

5. The process, according to claim 1, wherein the grid is formed so as to present a network of spaced parallel and perpendicular lines for engagement with the surface of the fibrous mat.

6. The process, according to claim 1, wherein the grid is formed so as to present a non-geometrical pattern for engagement with the surface of the fibrous mat.

7. The process, according to claim 1, wherein the grid is formed so as to present points for engagement with the fibrous mat having varying distances from the surface of the fibrous mat in a direction normal to the surface of the fibrous mat.

* * * * *